US010068010B2

(12) United States Patent
Jurascheck et al.

(10) Patent No.: US 10,068,010 B2
(45) Date of Patent: Sep. 4, 2018

(54) METHOD, SYSTEM AND DEVICE FOR CONNECTING SIMILAR USERS

(71) Applicant: Pure International Limited, Kings Langley (GB)

(72) Inventors: Nicholas Heinrich Jurascheck, Bushey (GB); Steven Paul Smith, St. Albans (GB)

(73) Assignee: Pure International Limited, Kings Langley (GB)

( * ) Notice: Subject to any disclaimer, the term of this patent is extended or adjusted under 35 U.S.C. 154(b) by 174 days.

(21) Appl. No.: 14/963,990

(22) Filed: Dec. 9, 2015

(65) Prior Publication Data
US 2016/0110449 A1 Apr. 21, 2016

Related U.S. Application Data

(63) Continuation of application No. 13/745,980, filed on Jan. 21, 2013, now Pat. No. 9,239,866.

(30) Foreign Application Priority Data

Oct. 24, 2012 (GB) .................................. 1219091.4

(51) Int. Cl.
| | | |
|---|---|---|
| *G06F 17/30* | (2006.01) | |
| *H04L 29/06* | (2006.01) | |
| *H04L 29/08* | (2006.01) | |
| *H04W 4/021* | (2018.01) | |

(52) U.S. Cl.
CPC ........ *G06F 17/30743* (2013.01); *G06F 17/30* (2013.01); *G06F 17/30035* (2013.01);
(Continued)

(58) Field of Classification Search
CPC ............... G06F 17/30743; G06F 17/30; G06F 17/30035; G06F 17/3053; G06F 17/30752;
(Continued)

(56) References Cited

U.S. PATENT DOCUMENTS 5,303,393 A * 4/1994 Noreen ............... H04B 7/18523
455/12.1
6,748,237 B1 6/2004 Bates et al.
(Continued)

OTHER PUBLICATIONS

Baccigalupo, Claudio, et al., "Poolcasting: a Social Web Radio Architecture for Group Customisation", AXMEDIS 2007, Barcelona, Spain, Nov. 28-30, 2007, pp. 115-122.*
(Continued)

*Primary Examiner* — Robert Stevens
(74) *Attorney, Agent, or Firm* — Vorys, Sater, Seymour and Pease LLP; Vincent M DeLuca

(57) ABSTRACT

Methods, systems and devices for automatically connecting similar users wherein similarity is based on live audio listening information. The method comprises receiving and storing audio listening information at a server for a plurality of users and identifying the audio the user is currently listening to. The server uses the stored information to automatically generate a list of users similar to a particular user. The similarity between users can be based on audio users are currently listening to, so that the list of similar users comprises a list of users currently listening to the same audio as the particular user. The server filters the list of similar users to a specific geographic area, such as a town. The server then provides the particular user with information on the similar users which may enable the particular user to communicate with the similar users publicly or privately.

13 Claims, 7 Drawing Sheets

(52) U.S. Cl.
CPC .... *G06F 17/3053* (2013.01); *G06F 17/30752* (2013.01); *G06F 17/30761* (2013.01); *G06F 17/30766* (2013.01); *H04L 65/4076* (2013.01); *H04L 67/18* (2013.01); *H04L 67/42* (2013.01); *H04W 4/021* (2013.01)

(58) Field of Classification Search
CPC ......... G06F 17/30761; G06F 17/30766; H04L 65/4076; H04L 67/18; H04L 67/42; H04W 4/021
USPC ....................................................... 707/723
See application file for complete search history.

(56) References Cited

U.S. PATENT DOCUMENTS

| | | | |
|---|---|---|---|
| 6,819,919 | B1 | 11/2004 | Tanaka |
| 6,968,179 | B1 | 11/2005 | De Vries |
| 7,035,871 | B2 | 4/2006 | Hunt et al. |
| 7,076,202 | B1 | 7/2006 | Billmaier |
| 7,496,633 | B2 | 2/2009 | Szeto et al. |
| 7,653,761 | B2 | 1/2010 | Juster et al. |
| 7,720,871 | B2 | 5/2010 | Rogers et al. |
| 7,856,373 | B2 | 12/2010 | Ullah |
| 7,970,922 | B2 | 6/2011 | Svendsen |
| 8,060,525 | B2 | 11/2011 | Svendsen et al. |
| 8,112,720 | B2 | 2/2012 | Curtis |
| 8,117,193 | B2 | 2/2012 | Svendsen et al. |
| 8,117,281 | B2 | 2/2012 | Robinson et al. |
| 8,224,346 | B2 | 7/2012 | Himmelstein |
| 8,316,015 | B2 | 11/2012 | Svendsen et al. |
| 8,577,874 | B2 * | 11/2013 | Svendsen .......... G06F 17/30749 707/722 |
| 2002/0091790 | A1 * | 7/2002 | Cubley ................. H04H 20/82 709/217 |
| 2002/0138630 | A1 | 9/2002 | Solomon et al. |
| 2002/0184128 | A1 | 12/2002 | Holtsinger |
| 2005/0286546 | A1 * | 12/2005 | Bassoli ................ G11B 27/002 370/432 |
| 2006/0075432 | A1 | 4/2006 | Abbadessa et al. |
| 2006/0123080 | A1 | 6/2006 | Baudino et al. |
| 2006/0143236 | A1 | 6/2006 | Wu |
| 2007/0269787 | A1 | 11/2007 | Cronstrom |
| 2008/0045170 | A1 * | 2/2008 | Howley ................... H04B 1/06 455/186.1 |
| 2008/0051081 | A1 | 2/2008 | Nelson |
| 2010/0299615 | A1 | 11/2010 | Miluzzo et al. |
| 2012/0072418 | A1 | 3/2012 | Svendsen et al. |
| 2012/0072610 | A1 | 3/2012 | Svendsen |
| 2012/0166965 | A1 | 6/2012 | Nathan et al. |
| 2012/0271882 | A1 | 10/2012 | Sachdeva et al. |
| 2013/0073568 | A1 | 3/2013 | Federov et al. |
| 2013/0073983 | A1 | 3/2013 | Rasmussen et al. |
| 2013/0231763 | A1 | 9/2013 | Depke et al. |
| 2014/0114772 | A1 | 4/2014 | Mok et al. |
| 2014/0114985 | A1 | 4/2014 | Mok et al. |

OTHER PUBLICATIONS

Liu, Kuan Ting, et al., "Social Playlist: Enabling Touch Points and Enriching Ongoing Relationships Through Collaborative Mobile Music Listening", MobileHCI 2008, Amsterdam, The Netherlands, Sep. 2-5, 2008, pp. 403-406.

Chorianopoulos, Konstantinos, et al., "Content-Enriched Communication—Supporting the Social Uses of TV", The Journal of the Communications Network, vol. 6, Part I, Jan.-Mar. 2007, pp. 23-30.

Miller, Scott, et al., "Geoshuffle: Location-Aware, Content-Based Music Browsing sing Self-Organizing Tag Clouds", ISMIR 2010, Utrecht, The Netherlands, Aug. 9-13, 2010, pp. 237-242.

Anglade, Amelie, et al., "Complex-Network Theoretic Clustering for Identifying Groups of Similar Listeners in P2P Systems", RecSys '07, Minneapolis, MN, Oct. 19-20, 2007, pp. 41-48.

Gartrell, Charles M., "SocialAware: Context-Aware Multimedia Presentation via Mobile Social Networks", Master of Science Thesis, Dept. of Computer Science, Virginia Tech, Blacksburg, VA, © 2008, 42 pages.

Baumann, Stephan, et al., "BluetunA: Let Your Neighbour Know What Music You Like", CHI 2007, San Jose, CA, Apr. 28-May 3, 2007, pp. 1941-1946.

Knowles, Julian D., "A Survey of Web 2.0 Music Trends and Some Implications for Tertiary Music Communities", NationalCouncil of Tertiary Music Schools Conference 2007 Proceedings, Queensland Conservatorium, Griffith University, Brisbane, Australia, © 2007, 19 pages.

Karlsson, Borje F., et al., "A Mobile-Based System for Context-Aware Music Recommendations", AIAI 2012 International Workshops, Halkidiki, Greece, Sep. 27-30, 2012, pp. 520-529.

Kim, Jae Keong, et al., "A group recommendation system for online communities", International Journal of Information Management, vol. 30, © 2010, pp. 212-219.

Konstan, Joseph A., et al., "Chap. 2: Collaborative Filtering: Supporting Social Navigation in Large, Crowded Infospaces", Designing Information Spaces: The Social Navigation Approach, Springer-Verlag, London, UK, pp. 43-82.

Li, Xiaoqing, et al., "Agent-based buddy-finding methodology for knowledge sharing", Information & Management, vol. 43, Science Direct, Elsevier B.V., © 2006, pp. 283-296.

Harboe, Gunnar, et al., "Ambient Social TV: Drawing People into a Shared Experience", Chi 2008 Proceedings—Socio-Cultural Impact, Florence, Italy, Apr. 5-10, 2008, pp. 1-10.

Tanaka, Atau, et al., "Social Mobile Music Navigation Using the Compass", Proc. of the International Mobile Music Norkshop, Amsterdam, The Netherlands, 2007, 4 pages.

Chen, Ya-Xi, et al., "How Last.fm Illustrates the Musical World: User Behavior and Relevant User-Generated Content", Workshop on Visual Interfaces to the Social and Semantic Web (VISSW2010), IUI2010, Hong Kong, China, Feb. 7, 2010, pp. 1-9.

Miluzzo, Emiliano, et al., "CenceMe—Injecting Sensing Presence into Social Networking Applications", EuroSSC 2007, LNCS 4793, G. Kortuem et al, (Eds.), Springer-Verlag, Berlin, Germany, © 2007, pp. 1-28.

Belimpasakis, Petros, et al., "Experience Explorer: a Life-Logging Platform Based on Mobile Context Collection", 2009 3rd Intl Conf. on Next Generation Mobile Applications, Services and Technologies, IEEE Computer Society, © 2009, pp. 77-82.

Riva, Oriana, et al., "The DYNAMOS approach to support context-aware service provisioning in mobile environments", The Journal of Systems and Software, vol. 80, © 2007, pp. 1956-1972.

* cited by examiner

| LISTENING INFORMATION FOR MICHAEL JONES | | | | | | |
|---|---|---|---|---|---|---|
| RADIO STATION | DATE | START TIME | END TIME | PROGRAMME | MUSIC TRACK | LOCATION |
| 93.5 BBC RADIO 4 | 15/SEP/2012 | 14:20 | 15:00 | AFTERNOON DRAMA | | W2 1AA, LONDON UK |
| 100.0 KISS FM | 15/SEP/2012 | 17:00 | 19:00 | MICHAEL & CLARA | 1012, 2145 | W2 1AA, LONDON UK |
| 100.0 KISS FM | 14/SEP/2012 | 08:00 | 09:00 | RICKIE, MELVIN & CHARLIE | 3145, 5678 | WC1V 6XX, LONDON UK |
| 105.8 ABSOLUTE RAD. | 14/SEP/2012 | 17:00 | 18:00 | GEOFF LLYOD'S HOMETIME SH. | 5678, 8967 | W2 1AA, LONDON UK |
| 100.0 KISS FM | 13/SEP/2012 | 08:00 | 09:00 | RICKIE, MELVIN & CHARLIE | 1115, 7898 | WC1V 6XX, LONDON UK |
| 93.5 BBC RADIO 4 | 13/SEP/2012 | 18:00 | 18:30 | BBC 6:00 NEWS | | W1A 0DB, LONDON UK |

FIG. 5

METHOD, SYSTEM AND DEVICE FOR CONNECTING SIMILAR USERS

BACKGROUND

Many social networking applications, such as Facebook™, allow users to connect and communicate with other users with similar tastes and/or interests. Specifically, if a user likes a particular radio station, the user can join a group for people that like that particular radio station. The user can then connect and communicate with users who are also members of the group. However, none of the known social networking applications automatically connect users based on their audio listening preferences.

The embodiments described below are not limited to implementations which solve any or all of the disadvantages of known systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods, systems and devices for automatically connecting similar users wherein similarity is based on live audio listening information. The method comprises receiving and storing audio listening information at a server for a plurality of users. The audio listening information comprises information identifying the audio the user is currently listening to. The server uses the stored information to automatically generate a list of users similar to a particular user. In some cases the similarity between users is based on the audio the users are currently listening so that the list of similar users comprises a list of users currently listening to the same audio as the particular user. The server then filters the list of similar users to a specific geographic area. For example, the server may filter the list so that it only comprises similar users within the same town as the particular user. The server then provides the particular user with information on the similar users which may enable the particular user to communicate with the similar users publicly or privately.

A first aspect provides a method to connect similar users, the method comprising: storing, using computer storage media, information for a plurality of users, the information for each user comprising information identifying audio the user is currently listening to; automatically generating, at a server, a list of similar users for a particular user based on the information stored in the computer storage media; filtering, at the server, the list of similar users to include only similar users in a geographic area; transmitting information about the filtered list of similar users from the server to an end-user device associated with the particular user.

A second aspect provides a server to connect similar users, the server comprising: computer storage media configured to store information for a plurality of users, the information for each user comprising information identifying the audio the user is currently listening to; and a processor configured to: automatically generate a list of similar users for a particular user based on the information stored in the computer storage media; filter the list of similar users to include only similar users in a geographic area; and transmit information about the filtered list of similar users to an end-user device associated with the particular user.

A third aspect provides a system to connect similar users, the system comprising: a data communications network; a server according to the second aspect connected to the data communications network; and a plurality of end-user devices in communication with the server via the data communications network, each end-user device configured to: transmit the information for an associated user to the server; and receive the information about the filtered list of similar users from the server.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 5 is a schematic of listening information that is stored by the server of FIG. 1;

Figure 1:
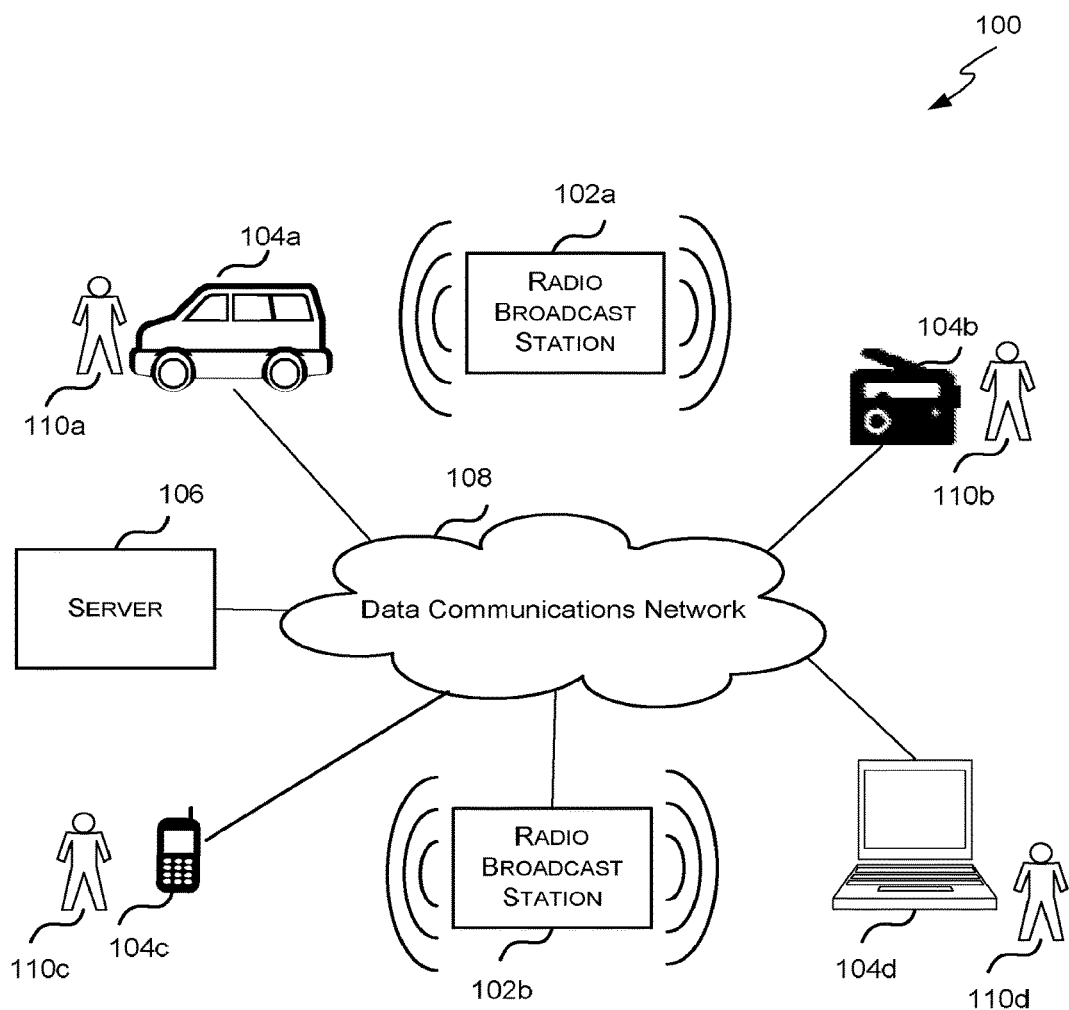
FIG. 1 is a block diagram of a system for connecting similar users.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, known social networking applications do not automatically connect users based on their audio listening preferences. More specifically, there are no known applications or systems which automatically and dynamically connect users based on what they are currently listening to.

Embodiments described herein relate to methods, systems and devices for automatically connecting similar users where similarity is based on live audio listening information. Specifically, the systems described herein receive audio listening information for a plurality of users. The system then uses this information to automatically generate and provide the users with information on similar users. The information on the similar users may be used by a user to communicate with the similar users using private (e.g. text message, email message, Skype™ message) or public (e.g. message board) means. In some cases the system may filter the list of similar users to those similar users in a specific geographic area prior to providing the list to the user. For example, the system may filter the list so that it only comprises similar users in the same town as the user.

Accordingly, the methods, systems and devices described herein automatically bring together people who have similar audio listening patterns and who are in the same geographic area. By automatically and dynamically connecting similar users as opposed to having users manually register themselves as part of a group, the group of similar users becomes more credible. Specifically, since users are automatically and dynamically added to a group based on their audio listening patterns it is more likely that the similar users will have things in common than a group wherein users can randomly and haphazardly join a group of users. The automatic and dynamic aspects of the systems described herein also make it more difficult for trolls to become members of a group. Specifically, since the allocation to a group is automatic and dynamic it is more difficult for a troll to emulate the behavior to join a group to post a negative or inappropriate comment.

The examples below assume that a user has opted-in to allow their listening details to be shared and to be dynamically added to the groups. However, the users also have the option of not providing these details if preferred.

Although the embodiments described herein will be described in reference to listening to radio broadcast signals, it will be evident to a person of skill in the art that the principles described herein may also be applied to streamed audio signals such as, but not limited to, music, podcasts, BBC's Listen Again™, audio books, natural sounds, Audioboo™ etc.

Reference is now made to FIG. 1 which illustrates a system 100 for automatically connecting similar users where similarity is based on radio listening information. The system 100 comprises a plurality of radio broadcast stations 102a and 102b for generating radio broadcast signals; a plurality of end-user devices 104a, 104b, 104c and 104d for allowing users 110a, 110b, 110c and 110d to listen to one of the radio broadcast signals and to receive information about other similar users; a server 106 for receiving and storing radio listening information from end-user devices 104a, 104b, 104c and 104d and providing the end-user devices 104a, 104b, 104c and 104d with information about similar users based on the stored information; and a data communications network 108 for enabling at least the end-user devices 104a, 104b, 104c and 104d to communicate with the server 106. In some cases the data communications network 108 may also enable the end-user devices 104a, 104b, 104c and 104d and/or the server 106 to communicate with one or more radio broadcast stations (e.g. radio broadcast station 102b).

Each radio broadcast station 102a and 102b generates and broadcasts one or more radio broadcast signals that may be received by a radio receiver. The radio broadcast stations 102a and 102b may be configured to broadcast the radio broadcast signal over radio waves using known techniques such as, but not limited to, Amplitude Modulation (AM), Frequency Modulation (FM), Digital Audio Broadcasting (DAB) and/or HD Radio™. The radio broadcast stations 102a and 102b may alternatively, or in addition, be configured to broadcast or stream the radio broadcast signal over a data communications network, such as data communications network 108. Although the system 100 is shown as comprising two radio broadcast stations 102a and 102b, it will be evident to a person of skill in the art that the principles described herein may be applied to systems with more or fewer radio broadcasts stations.

Each end-user device 104a, 104b, 104c and 104d is a computer-based device that is configured to allow a user 110a, 110b, 110c or 110d to receive and listen to one or more radio broadcast signals. The end-user devices 104a, 104b, 104c and 104d are also configured to provide the server 106 with radio listening information indicating the radio broadcast signal that the user is currently listening to. The server 106 then provides the end-user device 104a, 104b, 10c and 104d with information about other users that are "similar" to the user. As described in more detail below, the server 106 may automatically determine users are "similar" using one or more similarity criteria.

Once an end-user device 104a, 104b, 104c or 104d has received information about similar radio listeners from the server 106, the end-user device 104a, 104b, 104c or 104d may present the information to the user (e.g. via a display device). The user may then be able to sort and/or filter the information; and/or communicate with the similar users. For example, the end-user device 104a, 104b, 104c or 104d may allow the user to communicate privately (e.g. via email message, text message, Skype™ message) or publicly (e.g. via message/comment board) with the similar users.

In some cases, the user may have the ability communicate with the similar users directly. For example, where the communication is via a third party system, such as, Skype™, or Hotmail™ the user may be able to communicate with the similar users directly using their third party contact details (e.g. Skype™ username). In other cases, the user may have the ability to communicate with the similar users indirectly via another device, such as the server 106. For example, in these cases, if the user wanted to send a similar user an email, the user would sent the email message to the server 106 and the server 106 would transmit it as an email message to the similar user. Where communications are transmitted through another device, the similar users can keep their contact details (e.g. mobile number or email address) private. Whether the user has the ability to communicate directly or indirectly with the user may depend on the type of communication used. For example, the user may have the ability to communicate directly using some means of communications and indirectly using other means of communication.

The end-user devices 104a, 104b, 104c and 104d may be, for example, but are not limited to: a stand-alone radio (e.g. an AM/FM or DAB radio), a car-based radio, a personal computer, a tablet computer, a smart phone, a multifunctional home audio device (e.g. a home stereo system) or a connected television. An exemplary end-user device 104 is described in reference to FIG. 2.

Although the system 100 of FIG. 1 shows four end-user devices 104a, 104b, 104c and 104d, it will be evident to a person of skill in the art that the principles described herein may be equally applied to systems with more or fewer end-user devices.

The server 106 is a computer-based device or a group of computer-based devices that offers a similar user service to subscribers. Specifically, the server 106 is configured to receive and store radio listening information from subscribers via the end-user devices 104a, 104b, 104c and 104d indicating the radio broadcast signal that the user is currently listening to. An example of listening information that is stored by the server 106 is described in reference to FIG. 5. The server 106 then uses the stored information to automatically generate a list of users that are similar to a particular user and then provides this information to the particular user's end-user device.

The server 106 may determine users are "similar" using one or more similarity criteria. Similarity criteria may comprise, but is not limited to: the radio broadcast signal the users are currently listening to, and/or users' radio listening profiles. For example, in some cases the server 106 may determine that users are similar if they are currently listening to the same radio broadcast signal. In other cases, the server 104 may determine that users are similar if they have similar listening profiles (e.g. the users often listen to the same programme at the same time).

In some cases, the server 106 may be configured to filter the list of similar users to users in a specific geographic area prior to providing the list of similar users to the user. A geographic area may be, but is not limited to, a continent, a country, a group of countries, a union (e.g. the European Union), a city/town, a post code/zip code, province/state, a region, a sub-region, an area within a certain distance from the user (e.g. within 5 miles, within 10 miles, within 50 miles etc.) or any other physical or virtual geographic region. For example, the server 106 may be configured filter the list of similar users so that it only comprises similar users in the same town/city as the user. The user may have the ability to adjust the geographic area used by the server 106.

Figure 6:
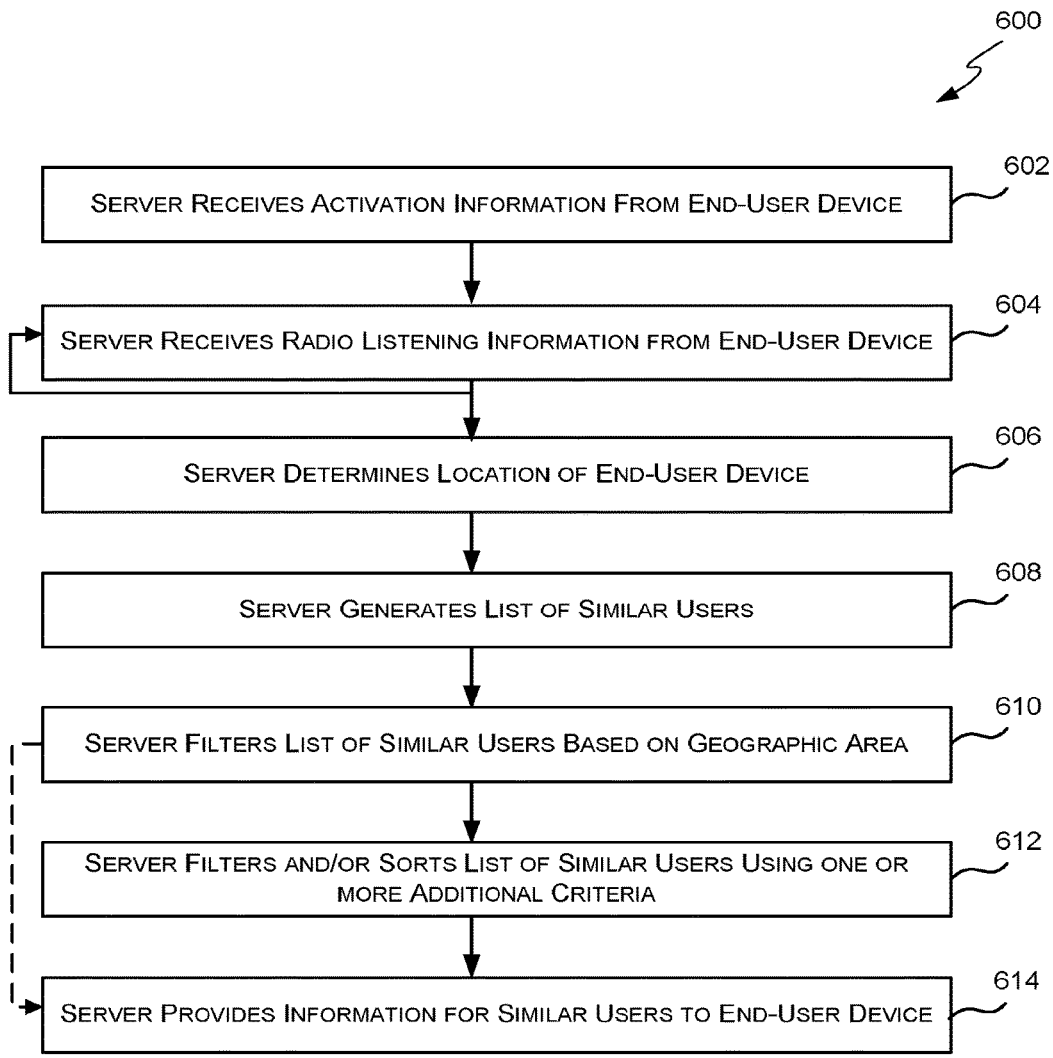
FIG. 6 is a flowchart of a method for generating a list of similar users.

An exemplary method for generating a list of similar users is described in reference to FIG. 6.

The data communications network 108 may be any network, or combination of networks, capable of enabling data communication between the other devices in the system 100. For example, the data communications network 108 may be a public switched telephone network (PSTN), a mobile telephone network, a wireless data network, a wired data network, or any combination thereof. Data communications network 108 may use any of a variety of addressing protocols, such as Internet Protocol. For example, data communications network 108 can comprise a portion of the Internet.

Although a single data communications network 108 is shown, it will be evident to a person of skill in the art that the data communications network 108 may comprise a plurality of connected data communications networks or a plurality of separate and independent data communications networks. Different end-user devices 104a, 104b, 104c and 104d may use different aspects of the data communications network 108 to communicate with the server 106. For example, one end-user device may communicate with the server 106 using a mobile communications aspect of the data communications network 108 and another end-user device may communicate with the server 106 using a wired data network aspect of the data communications network 108.

Figure 2:
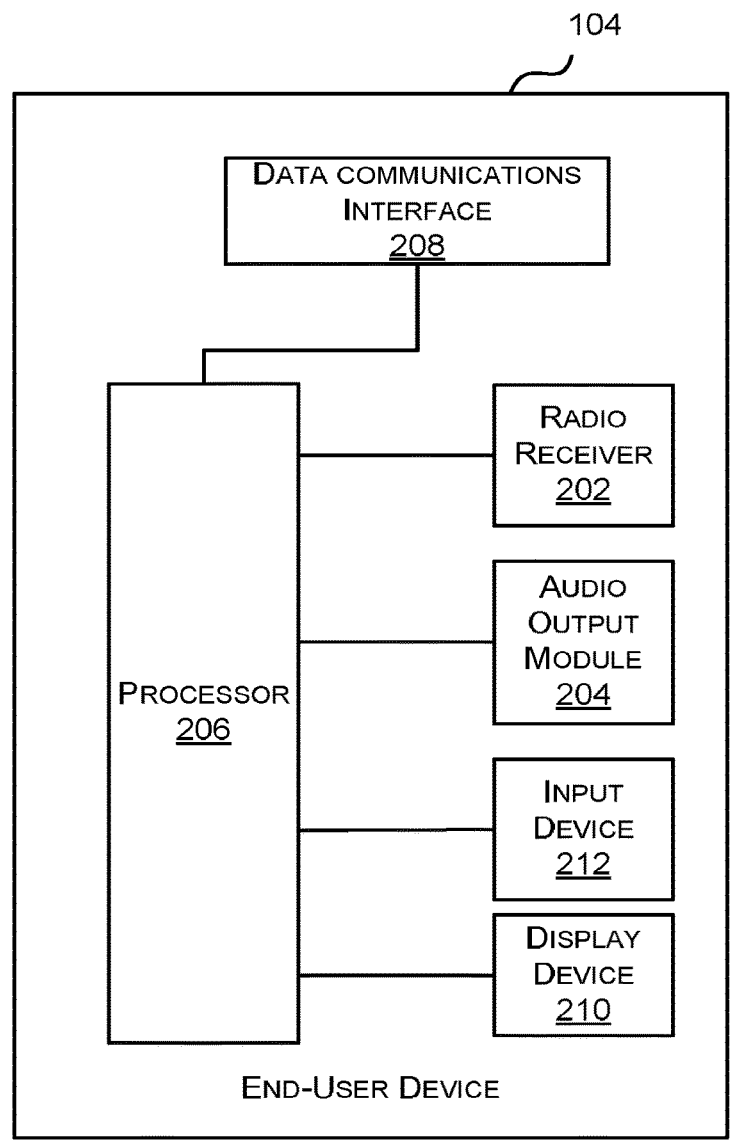
FIG. 2 is a block diagram of an end-user device of FIG. 1.

Reference is now made to FIG. 2 which illustrates an exemplary end-user device 104 of FIG. 1. The end-user device 104 comprises a radio receiver 202, an audio output module 204, a processor 206, a data communications interface 208, a display device 210, and an input device 212.

The radio receiver 202 is configured to receive radio broadcast signals broadcast by radio broadcast stations, such as radio broadcast stations 102a and 102b. The radio receiver 202 may be configured to receive AM, FM, DAB and/or HD Radio™ radio broadcast signals. Alternatively, or in addition, the radio receiver 202 may be configured to receive radio broadcast signals via a data communications network, such as data communications network 108.

Upon receiving a radio broadcast signal, the radio receiver 202 provides the audio of the radio broadcast signal to the audio output module 204. The audio output module 204 then outputs the audio in an audible manner so that the user can hear the audio. The audio output module 204 may, for example, be a speaker, headphones or any other suitable device that allows a user to hear audio.

The processor 206 monitors the radio receiver 202 to track what radio broadcast signals are being received by the radio receiver 202. The processor 206 then generates and sends radio listening information to the data communications interface 208 to transmit to the server 106. The radio listening information may comprise information identifying the radio broadcast signal the radio receiver 202 is currently tuned to, information identifying the user, a timestamp, and information identifying the location of the end-user device (e.g. the end-user device's IP address; or GPS (Global Positioning System) co-ordinates if the end-user device 104 comprises a module capable of determining the end-user device's GPS co-ordinates). In some cases the processor 206 is configured to send radio listening information to the data communications interface 208 on a periodic basis. In other cases, the processor 206 may be configured to send radio listening information to the data communications interface 208 when there is a change to the radio broadcast signal being received (e.g. the user has changed the channel or has turned on the end-user device 104). In yet other cases, the processor 206 may be configured to send radio listening information periodically and when a change is detected.

In some cases, the processor 206 may also be configured to monitor any other music that is played on the end-user device 104 and provide this information to the data communications interface 208 to transmit to the server 106. For example, the processor 206 may be configured to monitor any Compact Disks (CDs) or MP3s played on the end-user device 104 and provide information on the particular album or music tracks played to the data communications interface 208 to transmit to the server 106. This information may be used by the server 106 to generate a more detailed audio listening profile for the user.

The data communications interface 208 is configured to transmit the radio listening information to the server 106 via the data communications network 108. The data communications interface 208 may support one or more wireless data communication technologies (e.g. Wi-Fi, cellular, satellite) and/or wired data communication technologies (e.g. Ethernet, Token Ring).

The data communications interface 208 is also configured to receive information from the server 106 via the data communications network 108 about similar users (e.g. users currently listening to the same radio broadcast signal). The data communications interface 208 provides the similar user information to the processor 206 where it is formatted and then provided to the display device 210 for display to the user.

The display device 210 may be any device suitable for displaying information to a user. The display device 210 may be internal or external to the end-user device 104. Examples of screens for displaying similar user information to the user are described in reference to FIGS. 3 and 4.

Once the information has been displayed to the user, the input device 212 may enable the user to sort and/or filter the list of similar users and/or communicate privately (e.g. email message, text message, Skype™ message) or publicly (e.g. message/comment board) with the similar users. The input device 212 may be any suitable device for receiving input from a user, such as, but not limited to, a mouse, keyboard, keypad, or touch screen.

In some cases, the end-user device 104 may be configured to only send and receive data to/from the server 106 after the user has activated the similar user service on the end-user device 104. Activating the similar user service may comprise receiving input via the input device 212 to activate the service. In some cases the input may be an acknowledgement (e.g. a specific button press) that the user wishes to activate the service. Once the activation information has been received from the user, the processor 206 and the data communications interface 208 work together to notify the server 106 that the user has activated the service. Once the server 106 has been notified of the activation the end-user device 104 will receive similar user information from the server 106 and the user's information may be provided to other similar users.

The user may manually deactivate the service using a similar procedure (e.g. via the input device 212) or the server 106 may automatically deactivate the service for the particular user if it has not received radio listening information from the end-user device 104 for a predetermined period of time (e.g. after the end-user device has been turned off or if the end-user device has lost communication with the server 106).

In some cases, the user may be required to register with the server 106 before he/she is able to use the similar user service. Registration may require the user to provide personal information such as their name, address, home telephone number, mobile number to the server 106. This information may be used to create a profile for the user. The server 106 may also provide the user with user identification information (e.g. username and password) which is used to login and use the service. In these cases the user may first have to login (via, e.g. username and password) to the service prior to activating the service.

Figure 3:
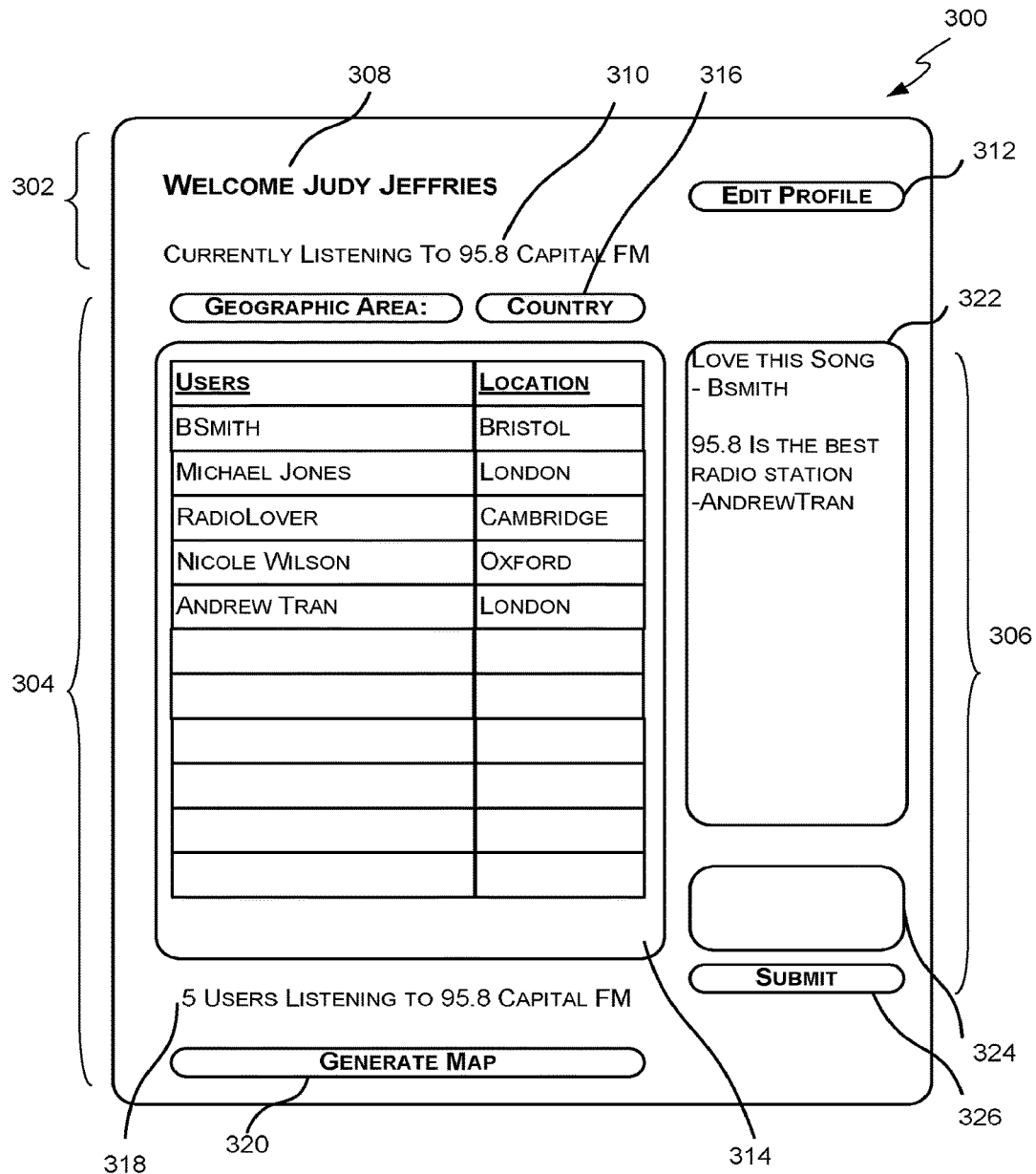
FIG. 3 is a schematic of a screen for displaying similar user information.

Reference is now made to FIG. 3, which illustrates an exemplary screen 300 for displaying similar user information at the end-user device 104. The screen 300 comprises a user section 302 for displaying information about the current user, a similar user section 304 for displaying information about similar users (e.g. users that are currently listening to the same radio broadcast signal), and a user forum or message board section 306 which allows the similar users to post messages or comments to the group of similar users.

The user section 302 comprises a user identification section 308, a current radio broadcast signal section 310, and an edit profile button 312. The user identification section 308 identifies the user to confirm that the information displayed corresponds to the correct user. The user identification section 308 may identify the user by name, username or any other suitable identification information. For example, the user identification section 308 in FIG. 3 indicates that the current user is "Judy Jeffries".

The current radio broadcast signal section 310 displays information identifying the radio broadcast signal that the user is currently listening to. The radio broadcast signal may be identified by its channel number and/or name. For example, in FIG. 3 the current radio broadcast signal is identified by "95.8 Capital FM". In some cases the current radio broadcast signal section 310 may also display additional information about what is currently being broadcast on the radio broadcast signal. For example, the current radio broadcast signal section 310 may also display the programme or music track that is currently playing on the radio broadcast signal (if that information is available).

The edit profile button 312 allows the user to edit their profile. Specifically, when the user subscribes to the similar user service provided by the server 106, the user may be asked to provide personal information such as their name, address, telephone number, mobile telephone number and Skype™ username. The user may then be able to select which personal information is visible to other users. The user may also be able to select a username to be displayed to other users (if they do not wish to user their full name).

The similar user section 304 comprises a similar user list 314, a geographic area setting 316, similarity information 318, and a generate map button 320. The similar user list 314 displays information about the similar users received from the server 106. Each row of the similar user list 314 may represent a separate similar user. For example, in FIG. 3 there are five similar users ("BSmith", "Michael Jones", "RadioLover", "Nicole Wilson", and "Andrew Tran") and thus there are five rows.

In FIG. 3, the similar user list 314 displays two columns of information—a user column and a location column—although it will be evident to a person of skill in the art that more or fewer columns may be displayed based on the information provided by the server 106 and the user settings. The user column displays the similar user's username. The username displayed may be the user's full name (e.g. "Michael Jones", "Nicole Wilson" or "Andrew Tran") or another username (e.g. "BSmith" or "RadioLover") set in their profile. The location column displays information on where the similar user is located. The location information may describe where the similar user is currently located or may represent their "home" location (e.g. the location described in their profile). The location information may describe a specific predefined geographic area (e.g. post code, town, county, country) or a relative geographic area (e.g. within 5 miles of the user, within 10 miles of the user).

In some cases the user may be able to sort the list of similar users by clicking on one of the header labels. For example, if the user clicked on the "Users" header label the list may be sorted by username. Similarly, if the user clicked on the "Location" header the list may be sorted by location.

In some cases the user may be able to obtain more information about a particular similar user by clicking or otherwise activating the similar user's username. This additional information may enable the user to privately contact the similar user. For example, the additional information may comprise the similar user's address, mobile number and/or Skype™ ID. An example screen for displaying additional information for a similar user will be described in reference to FIG. 4.

The geographic area setting 316 displays what geographic area was used by the server 106 to generate the list of similar users. For example, the server 106 may generate a list of similar users in the same predefined geographic area (e.g.

post code, town/city, country etc.) as the user or within a certain geographic distance (e.g. within 5 miles, within 10 miles, within 50 miles) of the user. The user may be able to change the geographic area by clicking or otherwise selecting the geographic area setting 316. Specifically, in some cases after the user has clicked or otherwise selected the geographic area setting 316, the user may be provided with list of possible geographic areas (e.g. post code, town, county, country, within 5 miles, within 10 miles etc.). Once the user has selected a new geographic area a request is sent to the server 106 for updated similar user information reflecting the new geographic area. In response, the server 106 may provide the end-user device with updated similar user information reflecting the new geographic area which is displayed in the similar user section 304.

The similarity information 318 may describe the similarity criteria used by the server 106 to determine similarity. For example, in FIG. 3, the similarity information 318 states that there are "5 Users Listening to 95.8 Capital FM" indicating that the similarity criteria used is the radio broadcast signal that the users are currently listening to. It will be evident to a person of skill in the art that more or fewer information may be included in the similarity information 318.

The generate map button 320 may take the user to a map that shows the number of similar users graphically. For example, each similar user's location may be indicated on the map by a pin or other suitable identifier. The map may initially show the geographic area defined by the geographic area setting 316, but the user may have the option to zoom in or zoom out of that area. Each time the user zooms in or out a request may be sent to the server 106 for updated similar user information reflecting the new geographic area. In response, the server 106 may provide the end-user device with updated similar user information reflecting the selected zoom level which is shown in the map.

It will be evident to a person of skill in the art that the similar user section 304 shown in FIG. 3 is exemplary and that the similar user information may be presented to the user using any suitable format.

The message board section 306 comprises a message display section 322, a message entry section 324 and a submit button 326. The message display section 322 is used to display public messages from similar users. In some cases the message display section 322 may only display a predetermined number of the most recent messages or comments. In other cases the message display section 322 may display all of the messages or comments over a predetermined time. Where there are more messages or comments in the predetermined time than can be displayed in the message display section 322, the message display section 322 may comprise a scroll bar (not shown) that allows the user to scroll through the messages or comments.

In some cases, the messages or comments displayed in the message display section 322 may be updated to reflect any changes to the geographic area setting. For example, if the geographic area is set to a particular city (e.g. London), then the message display section 322 may only display messages from similar users (e.g. users listening to the same radio broadcast signal) that are the same city as the current user. If the geographic area setting is then changed so that it is set to a particular post code (W2), then the message display section 322 may be updated so that the message display section 322 only displays messages from similar users (e.g. users listening to the same radio broadcast signal) that are in the same post code as the user.

The message entry section 324 allows the user to type a public message or comment to the similar users. Once the user is satisfied with their message or comment the user may click or otherwise select the submit button 326 to send the message or comment to all of the other similar users. The specific users that will receive the comment or message may be determined by the similarity criteria used to group the users and the geographic area setting. For example, if the similarity criterion is the radio broadcast signal the user is currently listening to and the geographic area is set to the city/town, then only users listening to the same radio broadcast signal as the user and in the same city as the user will receive the comment or message. Once submitted, the message or comment may be displayed in the message display section 322 along with the user's username.

It will be evident to a person of skill in the art that the user forum or message board section 306 shown in FIG. 3 is exemplary and that means for posting messages or comments to similar users may be presented to the user using any suitable format.

Figure 4:
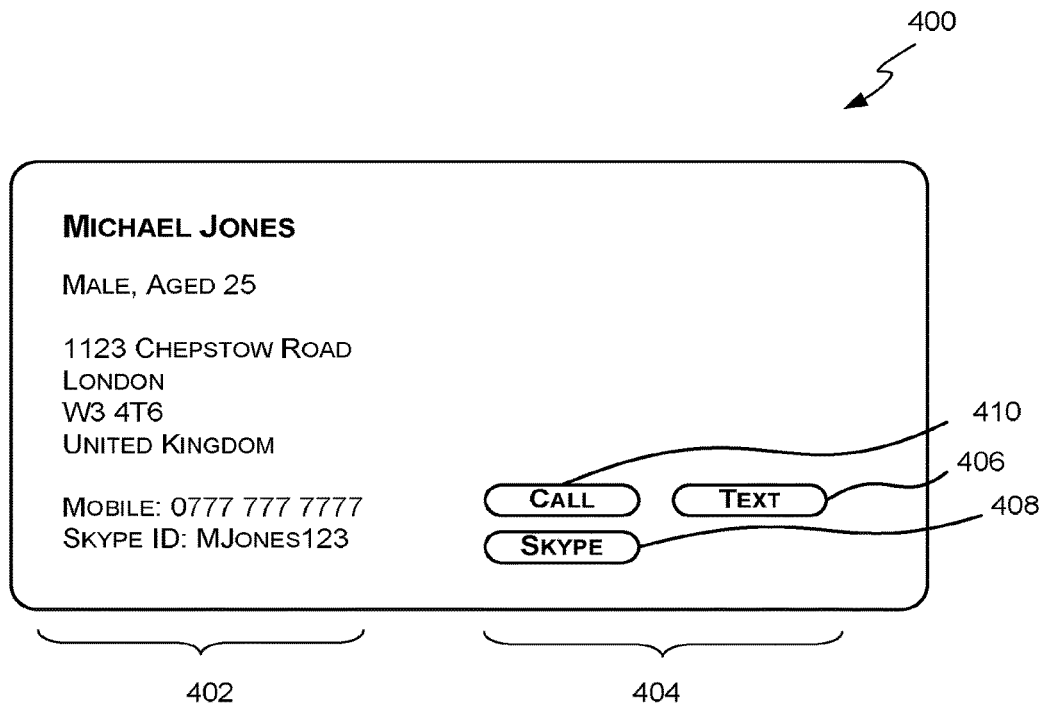
FIG. 4 is a schematic of a screen for displaying additional information for a similar user.

Reference is now made to FIG. 4, which illustrates an exemplary screen 400 for displaying additional similar user information. This screen 400 may be displayed, for example, after the user clicks on or otherwise activates a user listed in the similar user section 304 of the screen 3 shown in FIG. 3. The screen 400 of FIG. 4 comprises an additional similar user information section 402 and a communication section 404. The additional similar user information section 402 is used to display information about the similar user. For example, as shown in FIG. 4, the similar user information section 402 may display the similar user's username, gender, age, address, mobile number and/or Skype™ ID. The information that will be shown in the similar user information section 402 may be set in the user's profile. For example, some users may not wish to provide certain details to other users (e.g. address, mobile number).

The communications section 404 provides the user with a list of buttons 406, 408 and 410 that allow the user to communicate with the similar user using one or more modes of communication. The modes of communication that are available may be based on the additional information that the similar user has made available. For example, in FIG. 4, "Michael Jones" has provided his mobile number and Skype™ ID, thus the user is presented with options to contact Michael Jones by calling him, sending him a text message, or contacting him via Skype™. In some cases the user may initiate communication by a specific mode of communication by clicking or otherwise activating the corresponding button 406, 408 or 410. For example, the user may initiate a telephone call with "Michael Jones" by clicking or otherwise selecting the "Call" button 410.

In some cases, instead of displaying the user details, the system may only display the communication buttons (e.g. call, text) that allow the user to contact the similar user by the methods designated by the similar user. This allows the similar user to keep their contact details (e.g. email address, mobile number) private, but still allow communication by the designated methods. In these cases, the communication may be sent to the server 106 and then the server 106 transmits the communication to the user. For example, in these cases, if the user wants to call a similar user (e.g. Michael Jones), the user may click or otherwise activate the "Call" button 410 which sends a call request to the server 106, the server 106 then establishes the call with the similar user (e.g. Michael Jones) and then connects the user and the similar user (e.g. Michael Jones).

Reference is now made to FIG. 5 which illustrates exemplary listening information 500 for a user that is stored by the server. For example, FIG. 5 shows the listening information for exemplary user "Michael Jones".

The listening information is divided into a plurality of rows 502, 504, 506, 508, 510 and 512 and columns 514, 516, 518, 520, 522, 524 and 526. Each row 502, 504, 506, 508, 510 and 512 represents a particular listening session. In some cases a new listening session may be created each time the user starts listening to a new radio broadcasts signal. For example, a new listening entry may be created when the user first turns on their end-user device or when they change to a different radio broadcast signal. The listening session ends when the server 106 detects that the user is no longer listening to the particular radio broadcast signal. The server 106 may determine that the user is no longer listening to the particular radio broadcast signal when it receives information from the end-user device indicating that the user has changed the radio broadcasts signals, or when the server 106 does not receive listening information from the end-user device for a predetermined period of time.

In FIG. 5 the listening information for each listening session is placed in one of seven columns 514, 516, 518, 520, 522, 524 and 526, although it will be evident to a person of skill in the art that there may be more or fewer columns depending on the listening information received and/or stored. Specifically, in FIG. 5 the listening information comprises a radio station column 514, a date column 516, a start time column 518, an end-time column 520, a programme column 522, a music track column 524, and a location column 526.

The radio station column 514 is used to store information identifying the radio broadcast signal that the user was listening to during the listening session. The radio broadcast signal may be identified using any suitable means. For example, the radio broadcast signal may be identified using its numerical identifier (e.g. 93.5) or its alphanumeric description (e.g. BBC Radio 4) or a combination of the numerical identifier and the alphanumeric description.

The date column 516 is used to store information identifying the date when the user was listening to the radio broadcast signal identified in the corresponding radio station column 514. The date may be identified using any suitable means. For example, as shown in FIG. 5, the date may be shown in the format dd-mm-yyyy.

The start time column 518 is used to store information identifying the time at which the user started listening to the radio broadcast signal identified in the corresponding radio station column 514. The start time may be identified using any suitable means. For example, the time may be represented using a 24 hour clock (as shown in FIG. 5) representing the time where the user was when they were listening to the radio broadcast signal. In another example, the time may be represented as an offset from UTC (Coordinated Universal Time).

The end time column 520 is used to store information identifying the time at which the user stopped listening to the radio broadcast signal identified in the corresponding radio station column 514. The end time may be identified using any suitable means. For example, the time may be represented using a 24 hour clock (as shown in FIG. 5) representing the time where the user was when they were listening to the radio broadcast signal. In another example, the time may be represented as an offset from UTC. As described above, the server 106 may, for example, determine that the user has stopped listening to the radio broadcast signal when it receives a notification from the end-user device to this effect (e.g. notification that the user has changed the radio broadcast signal); or when the server 106 has not received listening information from the end-user device for a predetermined period of time (e.g. the end-user device has been turned off).

The programme column 522 is used to store information identifying the programme or programmes that were played/on during the listening session. The programmes may be identified using any suitable means. For example, the programme(s) may be represented using an alphanumeric description (e.g. "Afternoon Drama" or "Michael & Clara") as shown in FIG. 5, or they may be represented by a code that is mapped to a list of programmes.

The music track column 524 is used to store information identifying the music track or music tracks that were played during the listening session. The music tracks may be identified using any suitable means. For example, the music track(s) may be represented using an alphanumeric description, or they may be represented by a code (e.g. "1012", "5678") that is mapped to a library of music tracks. For example, the code "1012" may indicate the song "Your Body" by Christina Aguilera.

The location information column 526 is used to store information on the user's location when they were listening to the radio broadcast signal identified in the corresponding radio station column 514. In some cases the location information column 526 is used to record a series of locations for the user. For example, the server 106 may be configured to create a new location entry in the location information column 526 each time the server 106 detects that the user's location has changed. In other cases (as shown in FIG. 5) the location information column 526 may be used to record the last known location of the user. For example, the server 106 may be configured to overwrite the information in the location column 526 each time that the server 106 detects that the user's location has changed. The user's location may be identified using any suitable location information, such as post code, town/city, country/union, street, region, and/or GPS co-ordinates etc. For example, as shown in FIG. 5, the user's location may be identified by the post cost, city/region and/or country/union.

In some cases the server 106 receives at least a portion of the listening information directly from the end-user device 104a, 104b, 104c, or 104d and a portion of the listening information from a third party. In particular, the server 106 may be configured to obtain the programme and/or music track information from a third party based on the information provided by the end-user device 104a, 104b, 104c or 104d. For example, the server 106 may use the information identifying the radio broadcast signal and the timestamp information to obtain detailed information from an Electronic Programme Guide (EPG). In another example, the server 106 may use the information identifying the radio broadcast signal and the timestamp information to request additional information from the appropriate radio broadcast station (e.g. radio broadcast station 102b) via the data communications network 108.

Although FIG. 5 shows the listening information being stored in a table format, it will be evident to a person of skill in the art that the listening information may be stored and/or presented using any suitable format.

Reference is now made to FIG. 6 which illustrates a method 600 for automatically generating a list of similar users using the system of FIG. 1. At step 602, the server 106 receives activation information from an end-user device (e.g. end-user device 104a, 104b, 104c or 104d) that the user of the end-user device wishes to receive information from the server 106 on similar users. The activation information may, for example, comprise information identifying the user of the device. In these cases the information identifying the user may be provided to the end-user device via an input device (e.g. input device 212). Once the server 106 has received the activation information the server 106 will generate similar user information for the particular user and will provide the particular user's information to other users. The method proceeds to step 604.

At step 604, the server 106 receives radio listening information from the end-user device and stores the received information in computer storage media. The radio listening information may comprise, but is not limited to: information identifying the radio broadcast signal the user is currently listening to, information identifying the user, a timestamp, and/or information identifying the end-user device's location.

In some cases, prior to storing the radio listening information, the server 106 analyses the radio listening information to determine if the user has started a new listening session. As described above in reference to FIG. 5, a new listening session begins when a user starts listening to a new/different radio broadcasts signal. If the server has determined that a new listening session has begun the server 106 may end any previous listening session (if still active) and create a new listening session. If the server has determined that a new listening session was not begun, the server 106 may store any new listening information against the currently open listening session.

In some cases the server 106 may monitor the information in the computer storage media to determine if the server 106 has not received radio listening information from any end-user device for a predetermined period of time. If the server has determined that it has not received radio information from a particular end-user device for a predetermined period of time the server 106 may de-activate the particular user associated with the end-user device and end the current listening session (if active). This is to ensure that the similar user information provided to users does not comprise information for users that are no longer active on the system.

In some cases the server 106 may use the information identifying the radio broadcast signal and the timestamp information to obtain more detailed information from a third party on what is playing or was played on the radio broadcast signal. For example, the server 106 may use the information identifying the radio broadcast signal and the timestamp information to obtain detailed information from an Electronic Programme Guide (EPG). In another example, the server 106 may use the information identifying the radio broadcast signal and the timestamp information to request additional information from the appropriate radio broadcast station (e.g. radio broadcast station 102*b*) via the data communications network 108. The EPG and/or radio broadcast station (e.g. radio broadcast station 102*b*) may provide additional information such as, but not limited to, the programme and/or the music track that was playing at the identified time. The additional information obtained from the third party may be stored in the computer storage media along with the other information related to the user. For example, the additional information obtained from the third party may be stored in the computer storage media in association with the appropriate listening session.

This stored information may be used to generate a listening profile for the user. Specifically, the listening information stored for each user may include what radio broadcast signal(s) were listened to, over what duration and also which programme(s) or music track(s) were listened to at what time. From this information the server 106 may build a listening profile for each user specifying, for example, the user's favorite radio broadcast signal(s), time spent listening to each radio broadcast signal, which radio broadcast signals are listened to at what times of the day, favorite music tracks, bands and/or genres, and/or favorite radio programmes.

Step 604 is repeated each time the server 106 receives radio listening information from an end-user device.

Once the server 106 has received the radio listening information and stored it in the computer storage media, the method 600 proceeds to step 606.

At step 606, the server 106 determines the location of the user. In some cases, the server 106 may be configured to determine the location of the user from the information identifying the end-user device's location (e.g. end-user device's IP address, GPS co-ordinates) provided in step 604. For example, the server 106 may use geolocation to determine the user's location from the end-user device's IP address.

In other cases, the server 106 may be configured to determine the user's location based on the user's registration/profile information. Specifically, in some cases, before the user can use the similar user service provided by the server 106 the user may have to register with the server 106. During the registration process 106 the user may be asked to provide personal details such as their address, phone number etc. This information may then be used to generate a user profile. The information in the user profile may then be used to determine the user's location. For example, the server 106 may be configured to use the address (e.g. town, post code or country) information in the user's profile to determine the user's location. Once the server 106 has determined the location of the user, the method 600 proceeds to step 608.

At step 608, the server 106 generates a list of users that are similar to the user based on the stored information. The server may use one or more similarity criteria to assess the similarity of users. In some cases, the similarity criteria may comprise the radio broadcast signal that the users are currently listening to. For example, the server 106 may be configured to generate a list of users that are currently listening to the same radio broadcast signal as the user.

In other cases, the similarity criteria may comprise the users' listening profiles. For example, the server 106 may be configured to generate a list of users that have similar listening profiles to the user. For example, the server 106 may be configured to generate a list of users that have a common favorite radio broadcast signal as the user; common favorite music track, artist and/or genre as the user; and/or listen to the same radio broadcast signal and/or programme as the user for at least a portion of one or more days.

In yet other cases, the similarity criteria may comprise the radio broadcast signal listened to and the time of listening. For example, the server 106 may be configured to generate a list of users that have listened to the radio broadcast signal that the user is currently listening to within a predetermined time (e.g. within the last 3 hours). Once the list of similar users has been generated, the method 600 proceeds to step 610.

At step 610, the server 106 filters the list of similar users generated in step 608 to a specific geographic area. For example, the server 106 may filter the list so that it only comprises similar users in the same town/city as the user or similar users that are within a specific distance of the user (e.g. 5 miles). In some cases, the server 106 may be configured to use the geographic area set by the user (e.g. set via screen 300) and if one has not been set then the server 106 may be configured to use a default geographic area. For example, in some cases the default geographic area may be a predetermined distance from the user (e.g. 50 miles). In some cases, once the user has changed the geographic area setting (e.g. via screen 300) that change is stored by the server 106 so that the server 106 may use this geographic area setting the next time the user activates the service.

In some cases, once the server 106 has filtered the list of similar users based on geographic area, the method 600 proceeds to step 612. In other cases, once the server 106 has filtered the list of users based on geographic area, the method 600 proceeds to directly to step 614.

At step 612, the server 106 ranks and/or filters the list of similar users generated in step 610 using one or more additional criteria. The criteria that may be used to rank and/or filter the list of users may comprise, but is not limited to: the proximity of the users to the requesting user (e.g. the server 106 may be configured to rank the list of similar users so that the similar users that are closest to the user are at the top of the list), the duration that the users have been listening to the particular radio broadcast signal (e.g. the server 106 may be configured to rank the list of similar users so that the similar users that have been listening to the particular radio broadcast signal the longest are at the top of the list and those that have been listening to the particular radio broadcast signal the shortest are at the bottom of the list), and similarity of the users to the requesting user (e.g. the server 106 may be configured to compare one or more aspects (e.g. favorite radio broadcast signal, favorite music track) of the user's listening profile to the similar users' listening profiles to determine similarity, and users that are more similar may be placed at the top of the list and the users that are less similar are placed at the bottom of the list). Once the server 106 has ranked and/or filtered the list of similar users using one or more additional criteria, the method 600 proceeds to step 614.

At step 614, the server 106 provides information for the similar users to the requesting end-user device via a data communications network, such as the data communications network 108. The information for the similar users may comprise an entry for each of the similar users identified. Each entry may comprise one or more of the following: the user's name or username; information identifying the criteria used to determine similarity; geographic location information or information identifying the distance between the similar user and the user; and/or contact details for the similar user. For example the following is an exemplary entry for a similar user: BigJohn, listening to BBC Radio4, in Bristol, email: john.smith@hotmail.co.uk.

Upon receiving the information for the similar users from the server 106 the end-user device may display or otherwise present the information to the user. For example, in some cases the end-user device may be configured to display the information for the similar users in a screen, such as screen 300. The user may then have the option of sorting or filtering the list, and/or contacting one or more of the similar users directly and/or indirectly via a private method (e.g. email message, text message, Skype™) or a pubic method (e.g. message board).

In some cases, the server 106 may be configured to repeat steps 606 to 614 on a periodic basis so that the similar user information provided to the end-user devices is dynamically updated to reflect changes to the system (e.g. to reflect when users change radio broadcast signals and/or locations, log-out of the system or turn off their end-user device).

Figure 7:
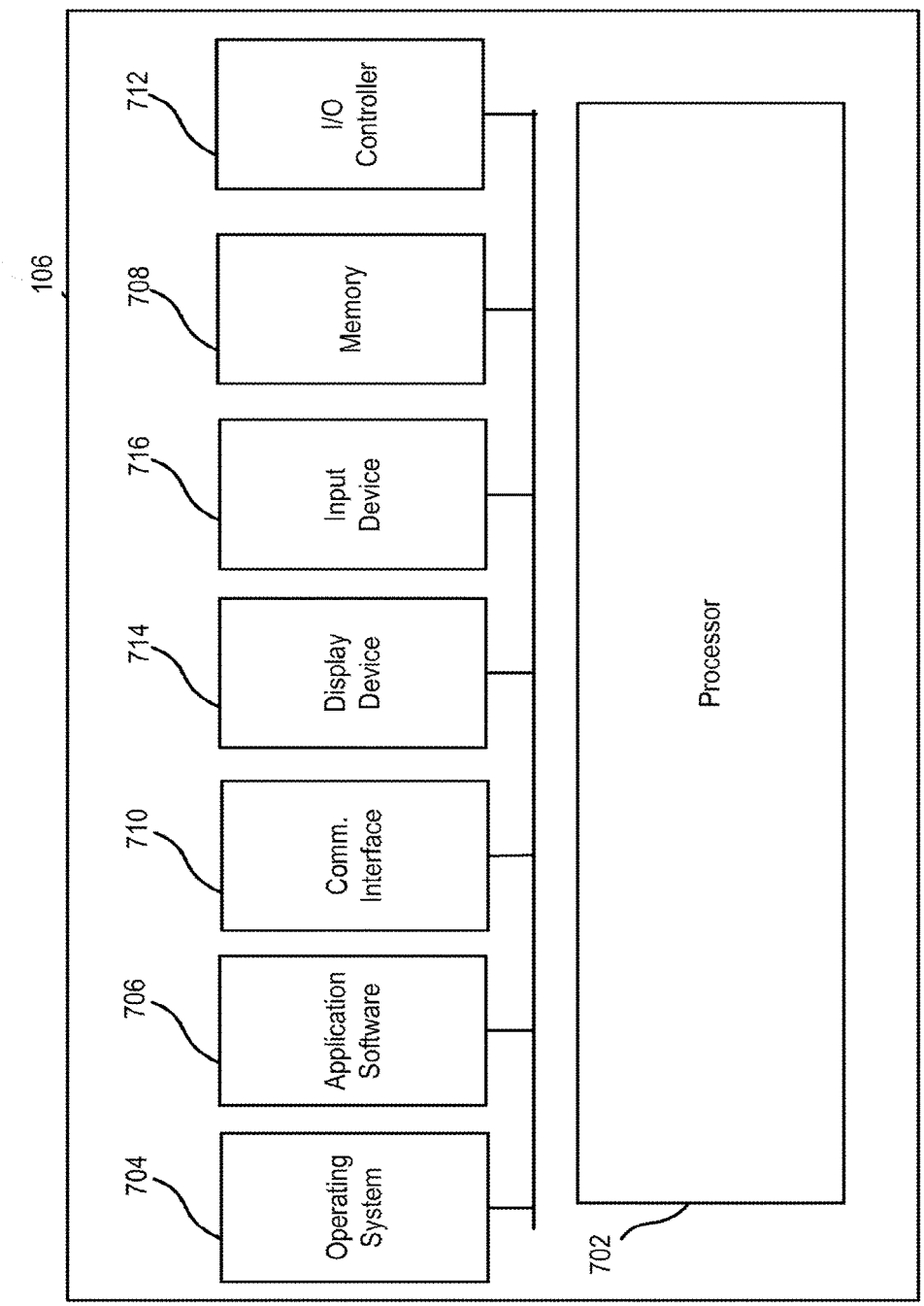
FIG. 7 is a block diagram of the server of FIG. 1.

Reference is now made to FIG. 7 which illustrates an exemplary server 106 which may be implemented as any form of a computing and/or electronic device, and in which embodiments of the foregoing description may be implemented.

The server 106 comprises one or more processors 702 which may be microprocessors, controllers or any other suitable type of processors for processing computer executable instructions to control the operation of the device in order to run applications. In some examples, for example where a system on a chip architecture is used, the processors 702 may include one or more fixed function blocks (also referred to as accelerators) which implement a part of the method of operation of the server 106 or applications described herein in hardware (rather than software or firmware). Platform software comprising an operating system 704 or any other suitable platform software may be provided at the server 106 to enable application software 706 to be executed on the device.

The computer executable instructions may be provided using any computer-readable media that is accessible by the server 106. Computer-readable media may include, for example, computer storage media such as memory 708 and communications media. Computer storage media, such as memory 708, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Although the computer storage media (memory 708) is shown within the server 106 it will be appreciated that the storage may be distributed or located remotely and accessed via a network or other communication link (e.g. using communication interface 710).

The server 106 also comprises an input/output controller 712 arranged to output display information to a display device 714 which may be separate from or integral to the server 106. The display information may provide a graphical user interface. The input/output controller 712 is also arranged to receive and process input from one or more devices, such as a user input device 716 (e.g. a mouse or a keyboard). In an embodiment the display device 714 may also act as the user input device 716 if it is a touch sensitive display device. The server 106 may also be provided with other functionality as is known for such devices.

It is noted that the server 106 shown in FIG. 7 is an exemplary server 106 that may be used in the methods and systems described herein. It will be evident to a person of skill in the art that the methods and systems described herein may be implemented with a server with more or fewer components than the server shown in FIG. 7.

The term 'processor' and 'computer' are used herein to refer to any device with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A method to connect users based on live audio listening information, the method comprising:
    storing, using computer storage media, audio listening information for a plurality of users, the audio listening information for each user comprising information identifying audio the user is currently listening to;
    automatically generating, at a server, a list of users that are currently listening to the same audio as a particular user based on the audio listening information stored in the computer storage media; and
    transmitting contact information for those users in the list of users from the server to an end-user device associated with the particular user, the contact information enabling the particular user to communicate with at least one of the users in the list of users.

2. The method according to claim 1, wherein the information identifying the audio the user is currently listening to comprises information identifying a particular radio broadcast signal.

3. The method according to claim 1, further comprising receiving the audio listening information for the plurality of users at the server from a plurality of end-user devices, each end-user device associated with a user.

4. The method according to claim 1, further comprising filtering, at the server, the list of users to include only those users in a same geographic area as the particular user.

5. The method according to claim 4, wherein the geographic area is provided to the server by the particular user.

6. The method according to claim 1, further comprising ranking the users in the list of users based on at least one of: proximity of the users in the list of users to the particular user, duration the users in the list of users have been listening to specific audio, and similarity of the users in the list of users to the particular user, wherein the similarity is determined based on one or more aspects of a listening profile for each user.

7. A server to connect users based on live audio listening information comprising:
    computer storage media configured to store audio listening information for a plurality of users, the audio listening information for each user comprising information identifying audio the user is currently listening to; and
    a processor configured to:
        automatically generate a list of users that are currently listening to the same audio as a particular user based on the audio listening information stored in the computer storage media; and
        transmit contact information for those users in the list of users from the server to an end-user device associated with the particular user, the contact information enabling the particular user to communicate with at least one of the users in the list of users.

8. The server according to claim 7, wherein the information identifying the audio the user is currently listening to comprises information identifying a particular radio broadcast signal.

9. The server according to claim 7, wherein the processor is further configured to receive the audio listening information for the plurality of users from a plurality of end-user devices, each end-user device associated with a user.

10. The server according to claim 7, wherein the processor is further configured to rank the users in the list of users based on at least one of: proximity of the users in the list of users to the particular user, duration the users in the list of users have been listening to specific audio, and similarity of the users in the list of users to the particular user, wherein the similarity is determined based on one or more aspects of a listening profile for each user.

11. The server according to claim 7, wherein the processor is further configured to filter the list of users to include only those users in a same geographic area as the particular user.

12. The server according to claim 11, wherein the processor is further configured to receive the geographic area from the particular user.

13. A system to connect users based on live audio listening information comprising:
    a server to connect users based on live audio listening information, the server comprising:

computer storage media configured to store audio listening information for a plurality of users, the audio listening information for each user comprising information identifying audio the user is currently listening to; and
a processor configured to:
automatically generate a list of users that are currently listening to the same audio as a particular user based on the audio listening information stored in the computer storage media; and
transmit contact information for those users in the list of users from the server to an end-user device associated with the particular user, the contact information enabling the particular user to communicate with at least one of the users in the list of users; and
the end-user device associated with the particular user, the end-user device configured to:
transmit the audio listening information for the particular user to the server; and
receive the contact information for those users in the list of users from the server.

* * * * *